W. G. OSBORN.
APPARATUS FOR LOADING CORN SHOCKS.
APPLICATION FILED OCT. 15, 1909.
1,027,356.
Patented May 21, 1912.
2 SHEETS—SHEET 1.
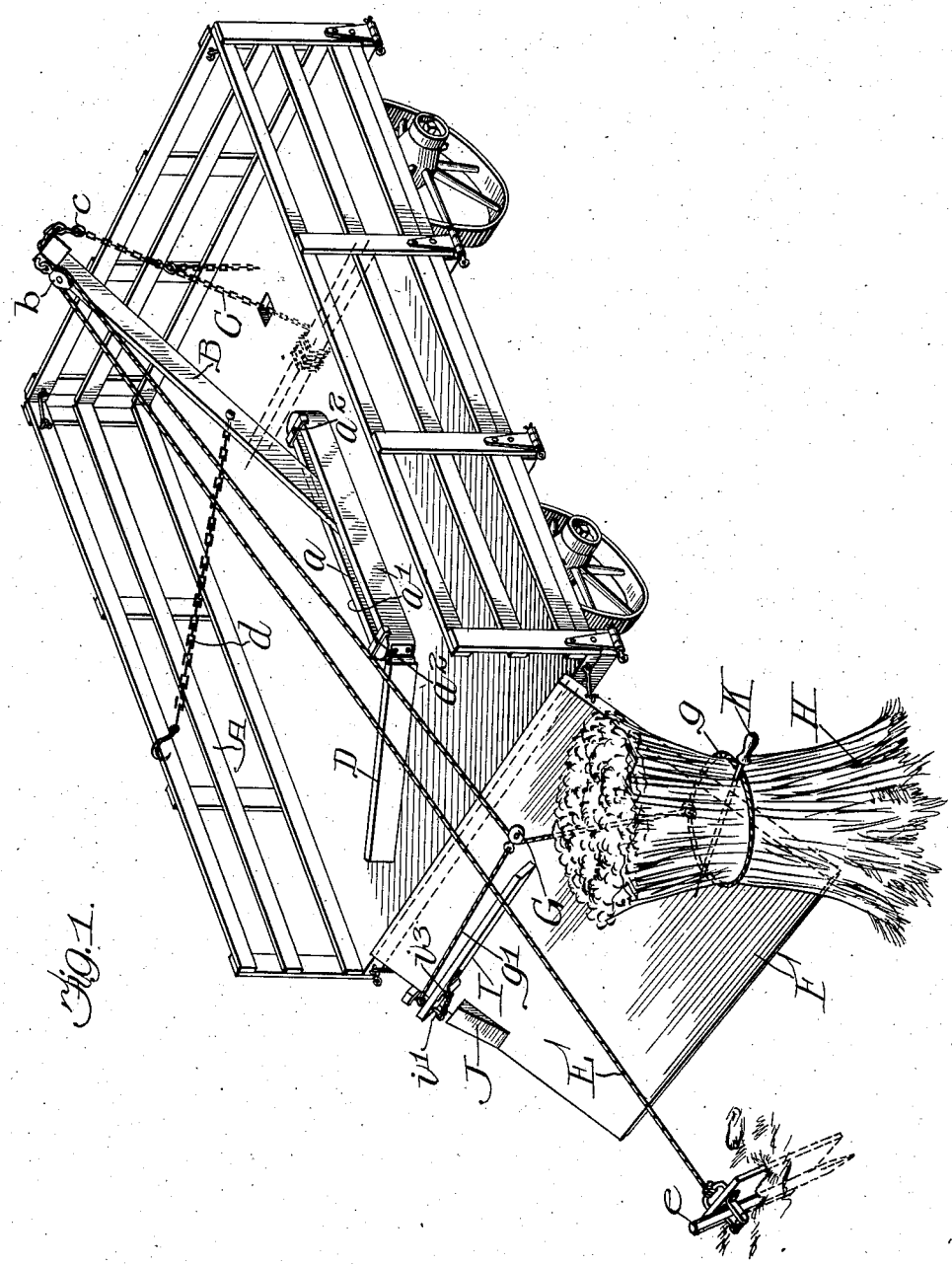

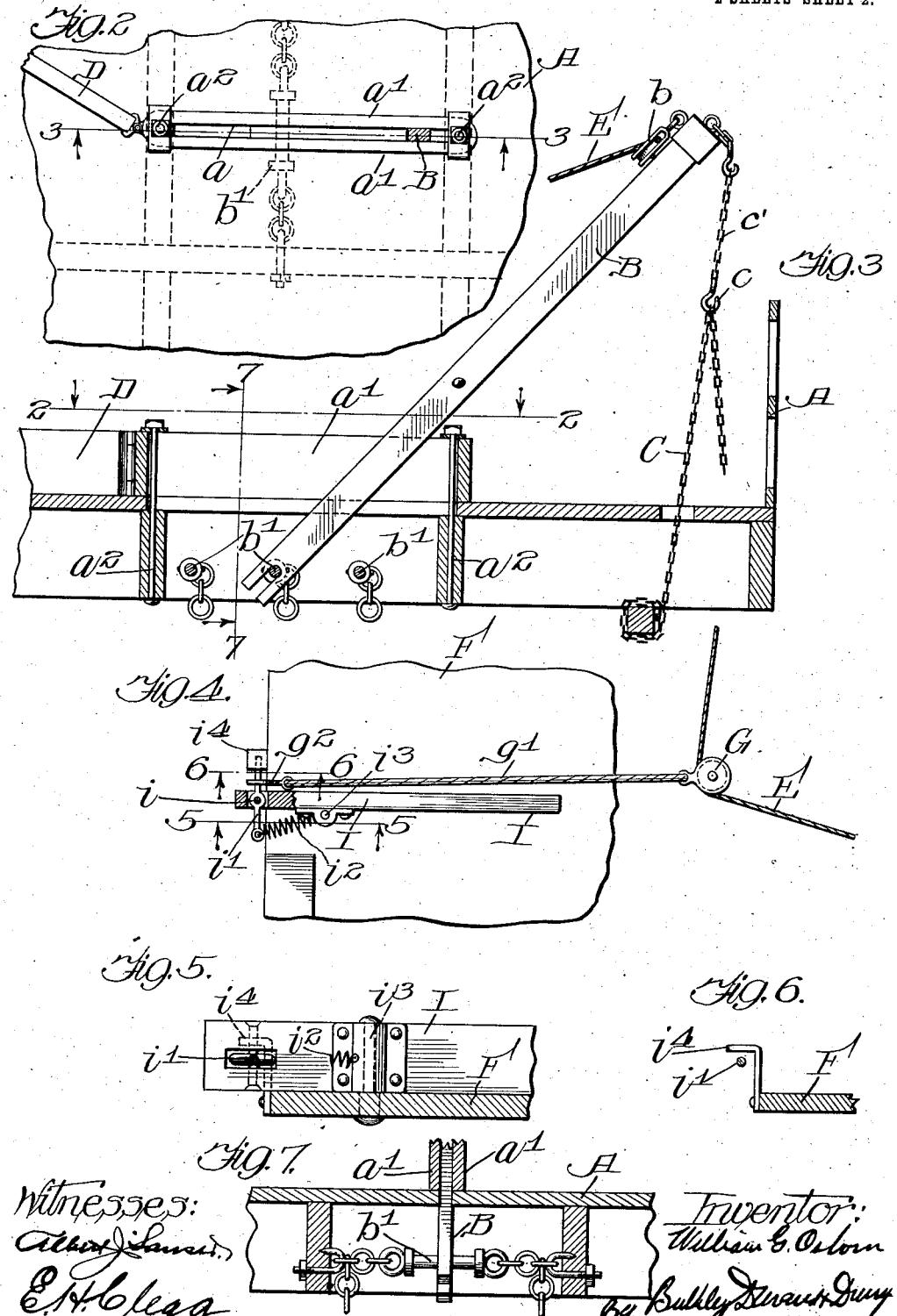

UNITED STATES PATENT OFFICE.

WILLIAM G. OSBORN, OF GARY, INDIANA.

APPARATUS FOR LOADING CORN-SHOCKS.

1,027,356.  Specification of Letters Patent.  Patented May 21, 1912.

Application filed October 15, 1909. Serial No. 522,768.

*To all whom it may concern:*

Be it known that I, WILLIAM G. OSBORN, a citizen of the United States of America, and resident of Gary, Lake county, Indiana, have invented a certain new and useful Improvement in Apparatus for Loading Corn-Shocks, of which the following is a specification.

My invention relates to corn shock loaders of the kind disclosed in my prior Patent No. 860,317. In the use of an apparatus of this kind, I find that better results are obtained when provision is made for moving the front post or pulley support toward and away from the rear end of the wagon. In my prior patent the said pulley around which the loading cable passes is fixed at the forward end of the wagon, and this is the proper position for same during certain stages of the loading. As I say, however, I find that better results are obtained, and the loading facilitated, by mounting the said pulley in such manner that it can be swung from the front to the rear of the wagon, or held at intermediate points, so that the shocks can be loaded at the front or at the rear and on top of each other with equal facility.

Also, my present invention contemplates an improved arrangement of the tripping or locking device by which the pulley at the tail-board or incline is automatically released as soon as the shock is in the position to be drawn up into the wagon.

It also contemplates an improved stake to be driven in the ground and to which the end of the loading cable is attached.

It further contemplates an arrangement whereby the lower end of the mast, upon the upper end of which said pulley is mounted, is movable from one position to another, longitudinally of the wagon, to facilitate loading.

The nature and advantages of my invention will, however, hereinafter more fully appear.

In the accompanying drawings, Figure 1 is a perspective of a wagon equipped with a corn shock loading apparatus embodying the principles of my invention. Fig. 2 is a detail plan view of the central portion of the said wagon, being a section on line 2—2 in Fig. 3. Fig. 3 is a detail longitudinal section on line 3—3 in Fig. 2. Fig. 4 is a detail plan view of the automatic trip or mechanism for releasing the pulley at the tail-board. Fig. 5 is an enlarged rear elevation of the mechanism shown in Fig. 4, being a section on line 5—5 in said figure. Fig. 6 is an enlarged detail section on line 6—6 in Fig. 4. Fig. 7 is a section on line 7—7 in Fig. 3.

As thus illustrated, the wagon A may be of any suitable known or approved construction. As shown, the bottom thereof is provided with a longitudinal slot $a$ flanked on opposite sides by the beams or cheeks $a'$, which latter are held in place by bolts $a^2$. The mast or upright B for supporting the pulley $b$ is arranged to work in said slot $a$, and has its lower end removably mounted upon a chain or other flexible support $b'$, whereby it may swing back and forth in the said slot. There are, if desirable, several of these supports $b'$, as shown, so that the position of the lower end of said mast B may be changed or varied longitudinally of the slot $a$. A chain C is secured to the front of the wagon, preferably to the axle, and adapted to be secured to a hook $c$ on the lower end of the chain $c'$ on the upper end of said mast or support, the said chain C being of sufficient length to permit the said mast or support to assume different positions. A deflector D is hinged to the rear end of the cheeks or beams $a'$, in order to deflect the corn shocks from the right to the left, as may be found necessary or desirable. A chain $d$ is attached to the mast B and can be hitched to either side of the wagon, so as to assist the board D in deflecting the shocks to one side or the other. The loading cable E has one end preferably secured to a stake $e$, which is driven in the ground, and said cable is of sufficient length to pass around the pulley $b$ and extend back to the rear end of the wagon. At the said rear end of the wagon there is a tail-board or incline F on which the corn shocks are adapted to slide, and another pulley G is hitched to the said tail-board. The loading cable passes around both of said pulleys, in the manner shown, and has its end provided with a loop, or suitable means, $g$ for attaching it to the corn shock H, in the manner shown. The pulley G is secured at the end of a cord or rod $g'$, and the other end of this cord or rod is provided with a ring or loop $g^2$. A trigger or tripping device I is pivoted at $i$ upon the left hand side of the said tail-board, and projects substantially to the middle of the latter. The shorter end of the said trigger or tripping device is provided with a short transverse lever or catch $i'$, which is connected by a spring $i^2$ with the hinge or pivot bearing $i^3$. The other end of the said short lever $i'$ is adapted to engage the underside of the hook $i^4$, and is adapted to extend through the ring or noose $g^2$, in the manner shown.

When the cable is hitched to a corn shock, and after the wagon is started forward, the corn shock is first thrown sidewise upon the tail-board or incline F. It then strikes the trigger or tripping device I and causes the latter to release the pivoted lever $i'$ from the catch or hook $i^4$, with the result that the pulley G is released and allowed to travel up into the wagon with the corn shock. Then the cable is brought back for the next corn shock, and the ring or noose $g^2$ is again placed in position upon the pivoted lever $i'$, and the apparatus is in readiness to have the loading operation repeated. For certain stages of the loading, the mast or support B is inclined forwardly in the manner shown in Fig. 1, and is so held by the chain C. After the wagon is loaded to a certain extent, and particularly while the shocks are being deposited to the rear end of the wagon, the said mast or support is preferably inclined to the rear, so as to bring the pulley $b$ substantially above the rear end of the wagon. Thus the loading is greatly facilitated. The small incline J on the platform or tail-board F prevents the shocks from catching on the trigger mechanism arranged immediately in advance thereof. A pin or skewer K can be inserted in the shock to help hold the rope in place thereon.

What I claim as my invention is:

1. An apparatus for loading corn shocks, comprising a wagon with a longitudinal slot in the bottom thereof, a mast or support disposed in said slot, means below said slot for supporting the said mast or support for free back and forth swinging movement in the slot, a loading cable, means carried by said mast or support for engaging said cable, and means for holding said mast in different positions.

2. An apparatus for loading corn shocks, comprising a wagon having a longitudinal slot in the bottom thereof, cheeks or beams flanking the said slot and suitably secured to the bottom of the wagon, a mast or support mounted to swing back and forth in said slot, and between said cheeks or beams, a loading cable, means on said mast or support for engaging said cable, and means for holding the mast or support in different positions.

3. An apparatus for loading corn shocks, comprising a wagon provided with a longitudinal slot in the bottom thereof, cheeks or beams disposed at opposite sides of said slot, a deflector secured to the rear end of said cheeks or beams, a loading cable, a mast or support mounted to swing in said slot, means on said mast or support for engaging said cable, and means for holding said mast or support in different positions.

4. An apparatus for loading corn shocks, comprising a wagon, a tail-board or incline for the rear end of said wagon, a loading cable, a trigger or tripping device pivoted to said tail-board or incline, a catch secured to said tail-board, a short lever pivoted on said trigger or tripping device, adapted to engage said catch, a spring controlling said short lever, a device for engaging said cable, and means for connecting said device with the said short lever, as set forth.

5. An apparatus for loading corn shocks, comprising a tail-board, tripping mechanism on said board, operated by the shock, and an incline on said tail-board in front of said mechanism, as set forth.

6. An apparatus for loading corn shocks, comprising a wagon mast, a loading cable engaged by the upper end of the mast, means including a plurality of pivots for changing the position of the lower end of said mast, by moving the same longitudinally of the wagon and an incline to receive the shocks at the rear end of the wagon, as set forth.

7. In a corn shock loader, a wagon with a longitudinal slot in the bottom thereof, a pivoted mast adapted to swing back and forth in said slot, means for holding the mast in different positions in said slot, and a loading cable connected with said mast.

8. In a corn shock loader, a rear incline for the wagon, a cable for drawing shocks up the incline, a sheave for said cable, means including a pivoted mast for adjusting said sheave longitudinally of the wagon, to vary the distance between the incline and said sheave, and means for holding the mast in different positions.

Signed by me at Chicago, Illinois, this 9th day of October 1909.

WILLIAM G. OSBORN.

Witnesses:
 WM. B. DURNION,
 E. H. CLEGG.

---

Copies of this patent may be obtained for five cents each, by addressing the "Commissioner of Patents, Washington, D. C."